US012652106B2

(12) United States Patent (10) Patent No.: US 12,652,106 B2
Wendt et al. (45) Date of Patent: Jun. 9, 2026

(54) METHOD AND SYSTEM FOR MOBILE DOCKING WITH LIFI

(71) Applicant: SIGNIFY HOLDING B.V., Eindhoven (NL)

(72) Inventors: Matthias Wendt, Würselen (DE); Andreas Felix Alfred Bluschke, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 352 days.

(21) Appl. No.: 18/021,946

(22) PCT Filed: Aug. 9, 2021

(86) PCT No.: PCT/EP2021/072143
§ 371 (c)(1),
(2) Date: Feb. 17, 2023

(87) PCT Pub. No.: WO2022/043038
PCT Pub. Date: Mar. 3, 2022

(65) Prior Publication Data
US 2024/0014900 A1     Jan. 11, 2024

(30) Foreign Application Priority Data

Aug. 25, 2020    (EP) ...................................... 20192575

(51) Int. Cl.
*H04B 10/116* (2013.01)
(52) U.S. Cl.
CPC .................................. *H04B 10/116* (2013.01)
(58) Field of Classification Search
CPC .................................................. H04B 10/116
(Continued)

(56) References Cited

U.S. PATENT DOCUMENTS

| | | | |
|---|---|---|---|
| 5,877,882 | A | 3/1999 | Green et al. |
| 10,179,281 | B2 | 1/2019 | Umezu et al. |
| (Continued) | | | |

FOREIGN PATENT DOCUMENTS

| | | |
|---|---|---|
| CN | 106685492 A | 5/2017 |
| CN | 111431566 A | 7/2020 |
| (Continued) | | |

OTHER PUBLICATIONS

Roadmap to the full-featured Li-Fi cloud.
(Continued)

*Primary Examiner* — Dalzid E Singh

(57) ABSTRACT

The invention herein is a method for transferring data between a docking station and a user device via LiFi. The docking station/user device comprises at least one LiFi transceivers, and the user device/docking station comprises at least one LiFi transceiver. The method comprising the steps of acquiring by the docking station/user device a first communication channel transfer property, the first communication channel being between a first LiFi transceiver of the docking station/user device and a first LiFi transceiver of the user device/docking station. Acquiring by the docking station/user device a second communication channel transfer property, the second communication channel being between a second LiFi transceiver of the docking station/user device and the first LiFi transceiver of the user device/docking station. Selecting by the docking station/user device one communication channel out of the first and second communication channels based on the acquired transfer property for each channel and transmitting data over the selected communication channel.

14 Claims, 6 Drawing Sheets

(58) Field of Classification Search
USPC ......................................................... 398/118
See application file for complete search history.

(56) References Cited

U.S. PATENT DOCUMENTS

| | | | | |
|---|---|---|---|---|
| 10,459,114 | B2 | 10/2019 | Nugent, Jr. et al. | |
| 10,998,970 | B1 * | 5/2021 | Passe ...................... | H04M 1/04 |
| 2009/0180780 | A1 * | 7/2009 | Ann ...................... | H04B 10/116 398/128 |
| 2010/0202780 | A1 * | 8/2010 | Tortelier .............. | H04B 10/116 398/118 |
| 2011/0229147 | A1 * | 9/2011 | Yokoi .................. | H04B 10/116 398/172 |
| 2015/0270900 | A1 | 9/2015 | Hilario et al. | |
| 2020/0153506 | A1 * | 5/2020 | Linnartz ............ | H05B 47/1985 |
| 2021/0203419 | A1 * | 7/2021 | Afgani ............... | H04B 10/1149 |
| 2022/0166506 | A1 * | 5/2022 | Carraro ................ | H04B 10/116 |

FOREIGN PATENT DOCUMENTS

| | | | |
|---|---|---|---|
| CN | 111541489 | A | 8/2020 |
| DE | 102010043154 | A1 | 5/2012 |
| EP | 3029855 | A1 | 6/2016 |
| JP | 2019022048 | A | 2/2019 |
| KR | 20060034327 | A | 4/2006 |
| WO | 2017169927 | A1 | 10/2017 |

OTHER PUBLICATIONS

Marvell Sets New Performance Record With Its G.hn Wave-2 Networking Technology. Based on Marvell's Revolutionary MoChi Architecture, Oct. 27, 2015; online available at: https://www. prnewswire.com/news-releases/marvell-sets-new-performance-record-with-its-ghn-wave-2-networking-technology-based-on-marvells-revolutionary-mochi-architecture-3001166683.html.
G.hn in Wikipedia; https://en.wikipedia.org/wiki/G.hn.
Pennie Walters: "The Risks of Using Portable Devices", 2012 Carnegie Mellon University amazon.com/images/1/71agoPh69rS. pdf. Produced for US-CERT. a government organization; https// www.us-cert.gov/sites/default/files/publications/ RisksOfPortableDevices.pdf.
LiFi standardization project IEEE802.11bb, 4 pages, accessed Dec. 15, 2025. <https://mentor.IEEE.org/802.11/documents?is_dcn=DCN% 2C%20Title%2C%20Author%20or%20Affiliation&is_group=00bb>.
I-tec USB-C Flat Docking Station with Power Delivery 60W + i-tec Universal Charger 60 W, 3 pages, accessed Dec. 15, 2025, <https:// i-tec.pro/en/produkt/c31flatv260w-2/>.
I-tec USB 3.0 / USB-C Dual Display Docking Station. 4 pages, Jul. 3, 2018.
Cimpanu, Here's a List of 29 Different Types of USB Attacks. 16 pages, Mar. 13, 2018, <https://www.bleepingcomputer.com/news/ security/heres-a-list-of-29-different-types-of-usb-attacks/>.
Vertical-cavity surface-emitting laser. Wikipedia, 2 pages, accessed Dec. 15, 2025, <https://en.wikipedia.org/wiki/Vertical-cavity_surface-emitting_laser>.
Soltani et al., Access Point Selection in Li-Fi Cellular Networks with Arbitrary Receiver Orientation. 2016 IEEE 27th Annual International Symposium on Personal, Indoor, and Mobile Radio Communications (PIMRC), 6 pages, Dec. 2016.
MIMO, Wikipedia, 20 pages, accessed Dec. 15, 2025, <https://en. wikipedia.org/wiki/MIMO>.

* cited by examiner

METHOD AND SYSTEM FOR MOBILE DOCKING WITH LIFI

CROSS-REFERENCE TO PRIOR APPLICATIONS

This application is the U.S. National Phase application under 35 U.S.C. §371 of International Application No. PCT/EP2021/072143, filed on Aug. 9, 2021, which claims the benefit of European patent application Ser. No. 20/192, 575.7, filed on Aug. 25, 2020. These applications are hereby incorporated by reference herein.

FIELD OF THE INVENTION

The present invention relates to a method and system for transferring data between a docking station and a user device via LiFi.

BACKGROUND OF THE INVENTION

Wireless transfer of data between a user device and peripheral devices or a network access point is necessary for allowing users to send and receive information. Well known standards for wireless data transfer includes WiFi and Bluetooth which are widely used in e.g. smartphones to connect to a network access point, stream audio to a speaker or video to a projector. One benefit of utilizing communication signals at microwave frequencies (such as in WiFi and Bluetooth) is that a signal can be reliably sent to, and received from, a user device over comparatively long distances using little power with small low-directivity sending and receiving antennas. At the same time, due to the good coverage brought by microwave frequency communication simultaneous usage of multiple user devices causes problems with interference and problems with limited bandwidth as the microwave spectrum becomes crowded.

To this end, LiFi communication between a user device and an access point has been proposed. LiFi utilizes amplitude modulated visible or infrared light to offer two-way communication between devices. As opposed to WiFi and Bluetooth the LiFi signals, being visible or infrared light, are highly directive which makes interference less of an issue and enhances security as the LiFi signals are more difficult to detect over greater distances or, e.g. through an opaque object such as a wall. Previous solutions for connecting a user device to a network access point via LiFi includes a regular LED light lamp being modified to transmit and receive amplitude modulated light at a frequency well beyond what is perceivable by the human eye. A user device can thus communicate with the network access point as long as it is illuminated by the light originating from the LiFi LED lamp. Other LiFi products use highly directional laser light to communicate between devices. In such cases, the sender and receiver of the user device is brought into direct alignment with the corresponding sender and receiver of the network access point to transfer data therebetween.

A problem with previous solutions for transferring data between a user device and a network access point is that, while being more directive than e.g. WiFi and Bluetooth, LiFi is not sufficiently directive to establish well defined communication zones. On the contrary, laser-based LiFi is too directive for practical communication in many scenarios, requiring meticulous alignment to function properly. Further the bandwidth of current LiFi communication is limited and the implementations, especially laser-based LiFi, introduce a substantial power consumption.

DE102010043154A1 is related to a portable electronic device, which comprises a functional device for providing electronic functionality, an optical data transmission device for conductor-unbound optical data communication with an external base device, and a power supply device for energy absorption by means of inductive coupling from a magnetic field emitted by the external base device and for supplying the functional device and the data transmission device with energy based on the energy extracted from the external magnetic field.

US2015270900A1 is related to a first electronic device that optically communicates with a second electronic device. Each of the devices includes one or more optical transmitters, one or more optical receivers, and one or more lenses where each of the lenses includes at least a first and a second optical path that are optically isolated from each other.

SUMMARY OF THE INVENTION

In view of the shortcomings of the existing solutions there is a need for an improved method and system for transferring data between a docking station and a user device via LiFi. It is an object of the present invention to overcome this problem, and to provide such a method and system which provides better defined communication zones, increased data rate and minimized power consumption.

According to a first aspect of the invention, this and other objects are achieved by a method for transferring data between a docking station and a user device via LiFi. Wherein the docking station comprises at least two LiFi transceivers, and wherein the user device comprises at least one LiFi transceiver. The method comprising the steps of acquiring by the docking station a first communication channel transfer property, the first communication channel being between a first LiFi transceiver of the docking station and a first LiFi transceiver of the user device, acquiring by the docking station a second communication channel transfer property, the second communication channel being between a second LiFi transceiver of the docking station and the first LiFi transceiver of the user device, selecting by the docking station one communication channel out of the first and second communication channels based on the acquired transfer property for each channel, transmitting data over the selected communication channel.

According to a second aspect of the invention, there is provided a method for transferring data between a docking station and a user device via LiFi, wherein the docking station comprises at least one LiFi transceiver, and wherein the user device comprises at least two LiFi transceivers, the method comprising the steps of acquiring by the user device a first communication channel transfer property, the first communication channel being between a first LiFi transceiver of the user device and a first LiFi transceiver of the docking station, acquiring by the user device a second communication channel transfer property, the second communication channel being between a second LiFi transceiver of the user device and the first LiFi transceiver of the docking station, selecting, by the user device, one communication channel out of the first and second communication channels based on the acquired transfer property for each channel, transmitting data over the selected communication channel.

The invention according to the first and second aspect enjoys the same benefits and corresponding embodiments as described in the below.

A LiFi docking station may alternatively be referred to as an LiFi access point. A LiFi docking station comprises a backhaul network utilizing any type of digital communication means, such as cables, WiFi, Bluetooth, LiFi, LTE, NFC or similar, to communicate with peripheral devices such as projectors, speakers, TV-screens, printers, network switches or similar. According to one aspect of the invention the LiFi docking station further comprises at least two LiFi transceivers to communicate and transfer data to/from a LiFi transceiver of a user device and a data transfer control unit, adapted to route the data between the user device and the peripheral device(s) and control the LiFi communication between the docking station and the user device.

The invention is based on the realization that by using at least two LiFi transceivers in the docking station (or analogously in the user device) a smaller and/or more well-defined communication zone for the user device (docking station) may be established, while increased data rate with lower power consumption is achievable. The communication transfer property may be a communication channel performance indicator. The communication channel transfer property may be the SNR of the channel, the channel capacity, the channel bandwidth or the channel data rate. Additionally or alternatively, the communication channel transfer property may be the power consumption per megabyte of transmitted data over the channel. For instance, with at least two LiFi transceivers in the docking station a communication channel transfer property (such as a communication channel SNR or maximum data rate) is acquired for the first communication channel, being between the first LiFi transceiver of the docking station and the at least one LiFi transceiver of the user device. Similarly, a communication channel transfer property is acquired for the second communication channel, being between the second LiFi transceiver of the docking station and the at least one LiFi transceiver of the user device. Based on the channel transfer property the docking station selects one communication channel for data transfers to/from the user device. For instance, the docking station may select the communication channel with the highest SNR or the communication channel with the lowest power consumption per megabyte of transmitted data. The same applies analogously when the user device comprises at least two LiFi transceivers. The user device acquires a communication channel quality indicator for the first and second communication channels and selects one communication channel for data transfers to/from the docking station. For instance, the user device may select the communication channel with the highest SNR.

Information regarding which communication channel that has been selected by the docking station or user device may be transmitted to the other entity (user device or docking station). Alternatively, information describing that a communication channel has been selected may be transmitted to the other entity. This allows either entity to request reselecting one of the communication channels when e.g. a movement has been detected in one of the entities. For instance, if the docking station comprises two LiFi transceivers and the user device comprises at least one LiFi transceiver the docking station may transmit information regarding that and/or which out of the communication channels that has been selected. Should the docking station and/or user device detect motion or any change of position or orientation in their relative placement the user device or docking station may request reselection of a communication channel. During reselection the method, according the first or second aspect of the invention, may be repeated. Additionally or alternatively, a change in the relative positioning of the docking station and user device may trigger the LiFi transceivers of docking station to be disabled for a predetermined waiting time, before switching back to an active state and reselect a communication channel. Similarly, the user device and/or docking station may be configured to request reselection and/or reselect a communication channel at scheduled time intervals.

It is understood that the invention according to the first and second aspect are completely analogous in terms of their beneficial technical effects and possible implementations. According to the first aspect the docking station comprises at least two LiFi transceivers and according the second aspect the user device comprises at least two LiFi transceivers. Any implementation described herein with the docking station comprising at least two LiFi transceivers communication with a user device with at least one LiFi transceiver applies analogously to implementations wherein the user device comprises at least two LiFi transceivers communicating with a docking station with at least one LiFi transceiver, and vice versa.

Further, in some implementations, at least one of the first and second LiFi transceivers not forming part of the selected communication channel is disabled. By disabling a LiFi transceiver of the docking station/user device the power consumption of the docking station/user device may be decreased while still transferring data over the selected communication channel, between the docking station and the user device. For example, if the docking station comprises at least two LiFi transceivers, the user device comprises at least one LiFi transceiver and the first communication channel is selected the second transceiver of the docking station is disabled to save power. If the user device comprises at least two LiFi transceivers, the docking station comprises at least one LiFi transceiver and the first communication channel is selected by the user device the second transceiver of the user device is disabled to save power. Disabling may comprise putting the transceiver in a power saving (sleep) mode such that the power consumption of the transceiver is decreased but not necessarily zero. The communication channel with the least desirable transfer property (such as the channel associated with the lowest SNR) may be disabled.

Information regarding which communication channel that has been disabled by the docking station or user device may be transmitted to the other device (user device or docking station). Alternatively, information describing that a communication channel has been disabled may be transmitted to the other device. If a state change (such as a motion or repositioning) of the docking station or the user device is determined, the docking station and/or user device may be configured to request reselection and/or reselect a communication channel as described in the above.

In some implementations the docking station/user device acquires a minimum link SNR, determines that the SNR of at least one of the first and second communication channel is below the minimum link SNR value and in response to such a determination disables both the first and second LiFi transceiver of the docking station/user device. The minimum link SNR is an SNR limit below which signals may be classified as out of reach, originating from outside a communication zone or from an incorrectly oriented user device. In other words, a communication channel SNR of at least the minimum link SNR is required to set up a communication link over the communication channel. The minimum link SNR is an SNR threshold at or above which a communication link may be established and below which it is deemed that a communication link may not be established.

For instance, if two LiFi transceivers of the docking station has an at least partial overlap between their respective zones (field of view) for detection and/or transmission (communication zone) the LiFi transceivers may be enabled and at least one of them communicating with a user device in the overlapping communication zone. The communication channel SNR for both the first and second communication channel will be above the minimum link SNR with the user device placed in the overlapping zone. If the SNR of one of the first and the second communication channel is below the minimum link SNR, which may be caused by a device being outside of the overlapping zone of the at least two LiFi transceivers, the two LiFi transceivers are disabled. By such an arrangement, a well-defined communication zone of any size may be established which is limited to an overlapping communication zone of the two LiFi transceivers. Analogously, the user device may comprise at least two LiFi transceivers with the docking station comprising at least one LiFi transceiver, the user device being configured to disable its transceivers as a response to the SNR of at least one of the first and second communication channel being below the minimum link SNR. By such an arrangement, a well-defined communication zone of any size may be established by the user device which is limited to an overlapping communication zone of its two LiFi transceivers. Accordingly, communication between the user device and the docking station may commence as the docking station is within the overlapping communication zone of the first and second LiFi transceivers of the user device. Disabling the LiFi transceivers in response to at least one communication channel being below the minimum link SNR will allow communication to commence within a zone consisting of the intersection between the communication zones of each transceiver.

Alternatively, the docking station/user device disables the first and second LiFi transceiver only in response to determining that the SNR of both of the first and second communication channels are below the minimum link SNR. Accordingly, a well-defined communication zone is established for communicating with a user device/docking station located within a communication zone of either one of the first and second LiFi transceiver. Disabling the LiFi transceivers only in response to both communication channels being below the minimum link SNR will allow communication to commence within a zone consisting of the union between the communication zones of each transceiver. An arbitrarily shaped communication zone may thus be formed by LiFi transceivers complementing each other. For example, multiple narrow beam LiFi transceivers may form an aggregate communication zone of a larger and more practical shape.

In some implementations there is provided a method for transferring data between a docking station and a user device via LiFi wherein the docking station comprises at least two LiFi transceivers and the user device comprises at least two LiFi transceivers. The method further comprising acquiring by the docking station a third communication channel transfer property, the third communication channel being between a first LiFi transceiver of the docking station and a second LiFi transceiver of the user device and acquiring by the docking station a fourth communication channel transfer property, the fourth communication channel being between a second LiFi transceiver of the docking station and the second LiFi transceiver of the user device. Wherein the first and fourth communication channels forms a first pair of communication channels and the second and third communication channels forms a second pair of communication channels. The docking station selects one of the first and second pair of communication channels based on the acquired transfer property for each channel and transmits data over the selected pair of communication channels.

Similarly, from the user device perspective, there is provided a method for transferring data between a docking station and a user device via LiFi wherein the docking station comprises at least two LiFi transceivers and the user device comprises at least two LiFi transceivers. The method further comprising acquiring, by the user device, a third communication channel transfer property, the third communication channel being between a second LiFi transceiver of the docking station and a first LiFi transceiver of the user device, acquiring by the user device a fourth communication channel transfer property, the fourth communication channel being between the second LiFi transceiver of the docking station and the second LiFi transceiver of the user device, wherein the first and fourth communication channels forms a first pair of communication channels and the second and third communication channels forms a second pair of communication channels, selecting, by the user device, one of the first and second pair of communication channels based on the acquired transfer property for each channel and transmitting data over the selected pair of communication channels.

Thus, with data transfer over a pair of communication channels the data transfer rate between the docking station and the user device is increased. A Multiple Input Multiple Output (MIMO) communication scheme may be utilized to increase the data transfer rate between the docking station and the user device. For instance, the data transfer rate of a pair of communication channels may be double that of the data transfer of a single channel. To avoid crosstalk for simultaneous data transfer over multiple communication channels frequency/wavelength-division multiplexing techniques, polarization-division multiplexing and/or spatial-division multiplexing techniques may be employed. Alternatively, with time-division multiplexing techniques the communication channels may be used at complementing time intervals.

Further, the user device and docking station may exchange information regarding which out of the communication channels that are selected. The docking station and user device may exchange information and agree upon which communication channels (and associated transceivers) that should be used during upstream/downstream data transfer. The entities may then disable their respective transceivers not being used. In some implementations, the user device and docking station may synchronously disable and enable transceivers to switch between a setup optimal for upstream data transfer and a setup optimal for downstream data transfer. The docking station and user device may exchange information to agree upon which communication channels to use in either setup.

Additionally, the docking station/user device may acquire a data rate requirement, such as a data rate dedicated SNR, determine that the SNR of at least the first communication channel exceeds the data rate dedicated SNR and select the first communication channel. The data rate dedicated SNR being a lower limit for the SNR required to maintain a threshold data rate. For a given signal bandwidth, modulation scheme, signal coding scheme and bit-error tolerance a minimum SNR may be determined which is required to obtain a particular data rate. Thus, the data rate dedicated SNR may change accordingly if transmission properties such as modulation scheme or coding scheme changes.

For instance, data transfer between the user device and the docking station may require a two-way data rate of 10 Mbit/s at certain transmission properties, in such cases, the SNR associated with a data rate of 10 Mbit/s may constitute the data rate dedicated SNR. The docking station/user device compares the data rate dedicated SNR with the SNR of each communication channel, finds that the first communication channel has an SNR equal to or greater than the data rate dedicated SNR and proceeds with transferring data over the first communication channel. Accordingly, a sufficient data transfer rate between the docking station and the user device is established.

By further disabling the second LiFi transceiver of the docking station/user device after the first communication channel has been determined to exceed the data rate dedicated SNR a sufficient data transfer rate may be accomplished while power consumption of the docking station/user device is decreased. Data transfer may continue via the first communication channel after the second LiFi transceiver has been disabled.

For example, there is provided a method according to the second aspect of the invention further comprising the steps of acquiring by the user device a data rate dedicated SNR, determining by the user device that the SNR of at least the first communication channel exceeds the data rate dedicated SNR, and disabling the second LiFi transceiver of the user device.

In some implementations, wherein the docking station and the user device each comprises at least two LiFi transceivers the docking station/user device may acquire a minimum link SNR. By determining that the SNR of at least one of the first, second, third and fourth communication channels, being defined between the at least two LiFi transceivers in the docking station and user device respectively, is below the minimum link SNR the first and second transceiver of the docking station/user device may be disabled. Alternately, the docking station/user device may disable the first and second LiFi transceivers only in response to the SNR of all four communication channels being below the minimum link SNR. Thus, communication between the docking station and the user device may be established as long as the at least one LiFi transceiver of the docking station is in communication range with at least one LiFi transceiver of the user device.

Furthermore, the communication channel transfer property may, in any of the aspects of the invention, be an upstream transfer property, a downstream transfer property or both. With upstream/downstream being defined from the perspective of a user device. Selecting a communication channel for data transfer based on the acquired transfer property for each channel may comprise selecting an upstream channel, a downstream channel or an upstream and downstream channel. As mentioned in the above, the communication channel transfer property may alternatively be replaced with e.g. a channel capacity, maximum data rate, bandwidth or a power consumption per megabyte of transferred data. Additionally, the selection of the communication channel might be to minimize the power consumption per megabyte of transferred data in the user device. In many implementations the user device uses limited battery power to power the transmitter and receiver amplifiers (which together forms a transceiver) while the docking station may be connected to the electrical grid.

Another situation is an application where two user devices log into the same docking station in neighbouring places. Here it might be relevant to use only a docking channel that is within view for both user devices. Or, alternatively, make sure that the two user devices are served from separate transceivers in the docking station even when the one with best SNR for both is the same.

According to a third aspect of the invention there is provided a system for transferring data, the system comprising a docking station, wherein the docking station comprises at least two LiFi transceivers and a data transfer control unit, a user device, wherein the user device comprises at least one LiFi transceiver, and wherein the data transfer control unit is adapted to acquire a first communication channel transfer property, the first communication channel being between a first LiFi transceiver of the docking station and a first LiFi transceiver of the user device, acquire a second communication channel transfer property, the second communication channel being between a second LiFi transceiver of the docking station and the first LiFi transceiver of the user device, and wherein the data transfer control unit is further adapted to select at least one communication channel out of the first and second communication channels and control at least one of the LiFi transceivers of the docking station for transmission of data over the selected communication channel.

According to a fourth aspect of the invention there is provided a computer program product comprising code for performing, when run on a computer device, the steps of acquiring a first communication channel transfer property, the first communication channel being between a first LiFi transceiver of the docking station and a first LiFi transceiver of the user device, acquiring a second communication channel transfer property, the second communication channel being between a second LiFi transceiver of the docking station and the first LiFi transceiver of the user device, selecting one communication channel out of the first and second communication channels based on the acquired transfer property for each channel, transmitting data over the selected communication channel.

According to a fifth aspect of the invention there is provided a system for transferring data, the system comprising a docking station, wherein the docking station comprises at least one LiFi transceiver, a user device, wherein the user device comprises at least two LiFi transceiver, and a data transfer control unit, wherein the data transfer control unit is adapted to acquire a first communication channel transfer property, the first communication channel being between a first LiFi transceiver of the user device and a first LiFi transceiver of the docking station, acquire a second communication channel transfer property, the second communication channel being between a second LiFi transceiver of the user device and the first LiFi transceiver of the docking station, and wherein the data transfer control unit is further adapted to select at least one communication channel out of the first and second communication channels and control the at least one of the LiFi transceivers of the user device for transmission of data over the selected communication channel.

According to a sixth aspect of the invention there is provided a computer program product comprising code for performing, when run on a computer device, the steps of acquiring a first communication channel transfer property, the first communication channel being between a first LiFi transceiver of a user device and a first LiFi transceiver of a docking station, acquiring a second communication channel transfer property, the second communication channel being between a second LiFi transceiver of the user device and the first LiFi transceiver of the docking station, selecting one communication channel out of the first and second communication channels based on the acquired transfer property for each channel, transmitting data over the selected communication channel.

The invention according to the third to sixth aspect features the same or equivalent embodiments and benefits as the invention according to the first and second aspect. Further, any functions described in relation to a method, may have corresponding structural features in a system or code for performing such functions in the computer program product.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. In other instances, well known constructions or functions are not described in detail, so as not to obscure the present invention.

In the following detailed description, some embodiments of the present invention will be described. However, it is to be understood that features of the different embodiments are exchangeable between the embodiments and may be combined in different ways, unless anything else is specifically indicated. Even though in the following description, numerous details are set forth to provide a more thorough understanding of the present invention, it will be apparent to one skilled in the art that the present invention may be practiced without these details. In other instances, well known constructions or functions are not described in detail, so as not to obscure the present invention.

Figure 1:
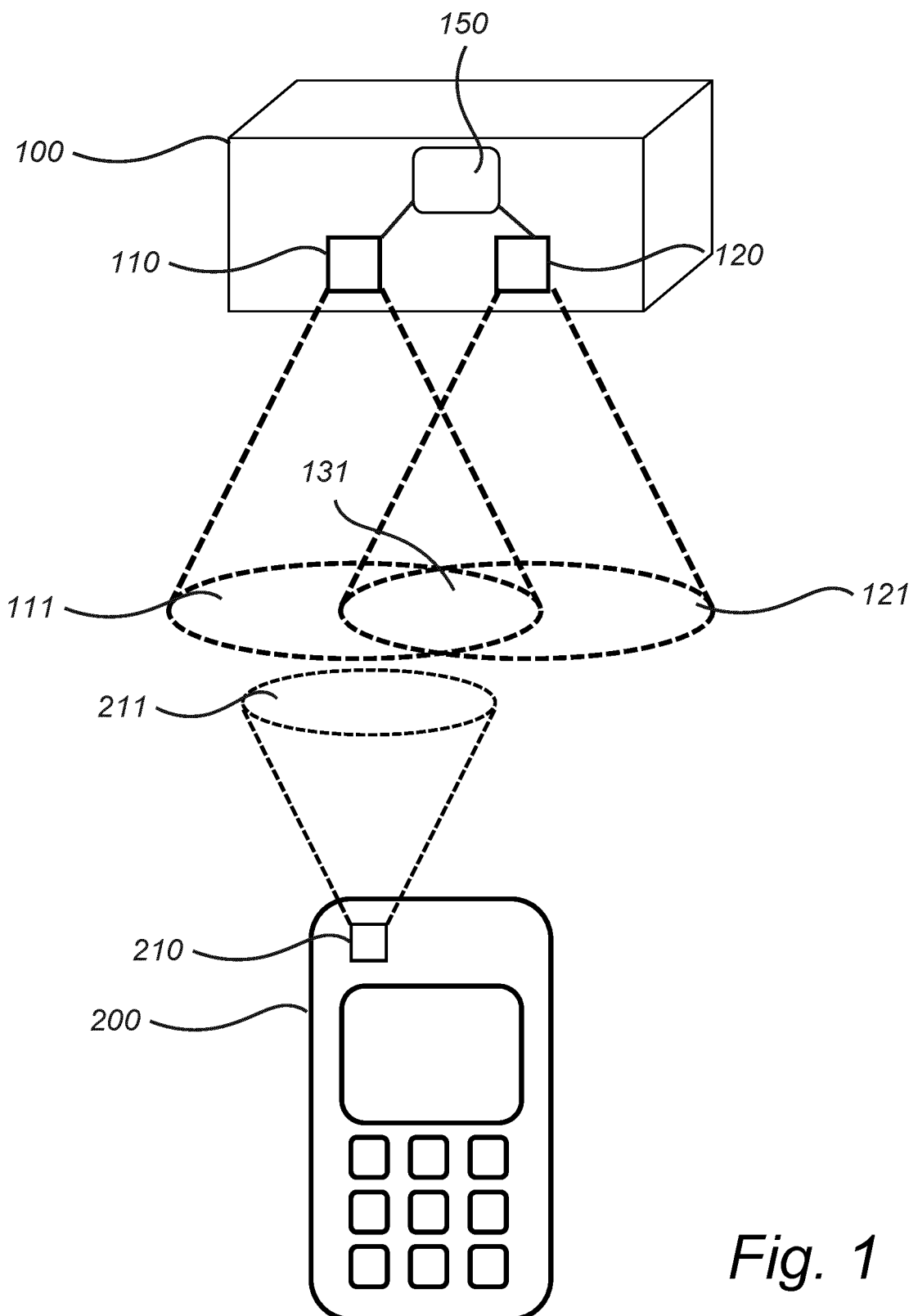
FIG. 1 is an illustration of a system for transferring data between a docking station and a user device via LiFi according to an aspect of the present invention, the docking station comprising at least two LiFi transceivers.

With reference to FIG. 1 there is depicted a docking station 100 with a first LiFi transceiver 110 and a second LiFi transceiver 120. Also illustrated is the communication zone 111, 121 of each respective LiFi transceiver 110, 120 in the docking station. Due to LiFi using light in the optical or IR spectrum to transfer data a zone illuminated directly by the LiFi transmitter and/or being visible to the LiFi receiver may be referred to as a communication zone 111, 121. A communication zone may be a surface in a field of view/field of illumination 111, 121 of a LiFi transceiver 110, 120. For example, the docking station may be placed on a table with the LiFi transceivers 110, 120 oriented such that their communication zones 111, 121 cover at least a part of the surface of the table. The transceivers 110, 120, (or at least one of the transmitters and the receivers of the transceivers 110, 120) may be oriented such that there is an overlapping communication zone 131. In an overlapping communication zone 131 the field of view/field of illumination 111 of the first LiFi transceiver 110 overlaps at least partially with the field of view/field of illumination 121 of the second LiFi transceiver 120. Further included in FIG. 1 is a user device 200 comprising a LiFi transceiver 210. The LiFi transceiver 210 of the user device 200 has an associated communication zone 211. The angular and spatial extent of the communication zones 111, 121, 211 illustrated in FIG. 1 is merely exemplary, for instance a LiFi transceiver 110, 120, 210 may have an essentially omnidirectional communication zone, a half-sphere communication zone or a more directive communication zone. The transmitter(s) and receiver(s) forming a LiFi transceiver 110, 120, 210 may be configured to form an arbitrary communication zone being the sum of the communication zones or an arbitrary overlapping communication zone. A user device 200 placed in the communication zone 111, 121 of a at least one LiFi transceiver 110, 120 with its LiFi transceiver 211 suitably oriented may communicate with the docking station 100.

The data transfer control unit 150 of the docking station 100 is adapted to acquire a first communication channel transfer property, the first communication channel being between a first LiFi transceiver 110 of the docking station 100 and the LiFi transceiver 210 of the user device 200. The data transfer control unit 150 further acquires a second communication SNR, the second communication channel being between the second LiFi transceiver 120 of the docking station 100 and the at least one LiFi transceiver 210 of the user device 200.

Acquiring a communication channel transfer property may be done by a handshake procedure between the docking station 100 and the user device 200. Such as e.g. sending, by one transceiver 110, 120 of the docking station 100 a test signal and receiving, from the user device 200, a response signal. The response signal comprising data indicative of the SNR (or any other transfer property) of the test signal as received by the user device 200 and the response signal being analyzed by the docking station 100 to determine the SNR of the response signal as received by the docking station 100.

The data transfer control unit 150 further selects a communication channel out of the first and second communication channels and controls at least one of the LiFi transceivers 110, 120 of the docking station 100 to transmit data over the selected communication channel. The data transfer control 150 unit may further disable at least one of the transceivers 110, 120 of the docking station 100 not forming part of the selected communication channel. In an exemplary embodiment, the data transfer control unit 150 selects e.g. the LiFi transceiver 110, 120 associated with the highest communication channel SNR. Additionally, the data transfer control unit 150 may disable the transceiver associated with the lowest communication channel SNR.

Further, the data transfer control unit 150 may acquire a minimum link SNR. Alternatively, the data transfer control unit 150 of the docking station may have a predetermined minimum link SNR stored locally. The data transfer control unit 150 determines, e.g. by comparing, that the SNR of at least one of the communication channels is below the minimum link SNR. If the SNR of at least one of the communication channels is below the minimum link SNR, the data transfer control unit 150 disables the first and second LiFi transceivers 110, 120 of the docking station 100.

The data transfer control unit 150 may also acquire a data rate dedicated SNR. The data rate dedicated SNR is indicative of an SNR required to obtain a requested data rate between the docking station 100 and the user device 200. If at least one of the communication channels has an SNR that exceeds the data rate dedicated SNR the data transfer control unit 150 selects such a communication channel and transfers data over the selected communication channel. If neither or both of the first and second communication channels exceeds the data rate dedicated SNR the data transfer control unit 150 may select the channel with the highest SNR and disable the LiFi transceiver associated with a lower SNR. If both communication channels are determined to exceed data rate dedicated SNR, the data transfer control unit 150 may be adapted to select either communication channel or a communication channel associated with a lower power consumption. For instance, at least two LiFi transceivers 110, 120 may consist of a high power and a low power LiFi transceiver, after determining that each communication channel exceeds the data rate dedicated SNR, the data transfer control unit 150 selects the communication channel associated with a low power transceiver. This satisfies the data rate dedicated SNR while consuming less power. The data rate dedicated SNR may be static, being the same at all times or it may preferably be a dynamic, changing with the data throughput requirements and transmission properties of the docking station 100 and the user device 200.

Figure 2:
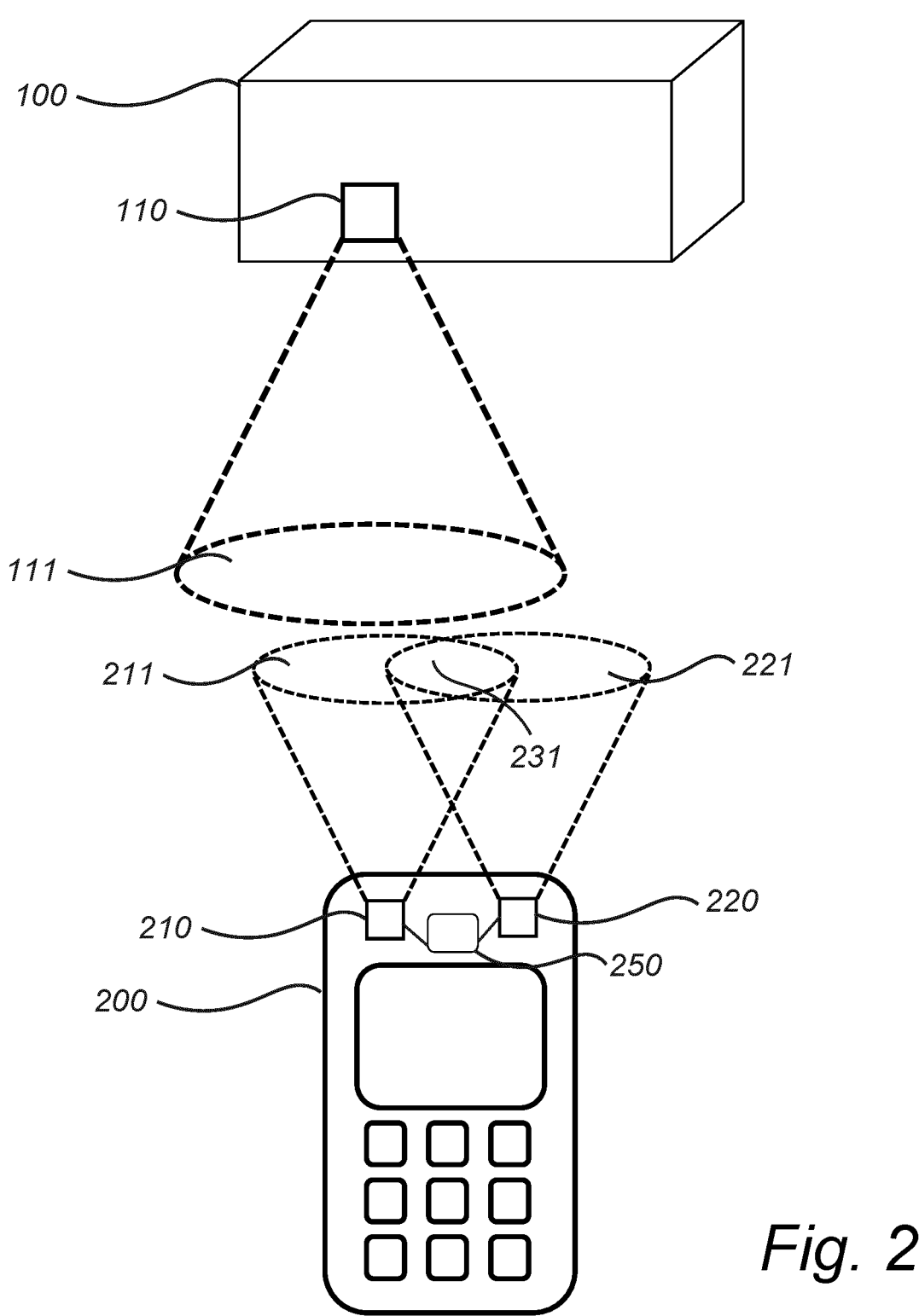
FIG. 2 depicts a system according to embodiments of the present invention, wherein the docking station and the user device each comprises two LiFi transceivers.

FIG. 2 illustrates a system for transferring data between a docking station 100 and a user device 200, the docking station 100 comprising at least one LiFi transceiver 110 and the user device comprising at least two LiFi transceivers 210, 220. Transfer of data in this system is achieved completely analogously as for the system (in FIG. 1) with at least two transceivers in the docking station 100 and at least one LiFi transceiver in the user device 200. With the difference that the data transfer control unit 250 is located in the user device, being adapted to acquire a first communication channel transfer property, the first communication channel being between a first LiFi transceiver 110 of the user device 200 and a first LiFi transceiver 110 of the docking station 100, and a second communication channel transfer property, the second communication channel being between a second LiFi transceiver 220 of the user device 200 and the first LiFi transceiver 110 of the docking station 100. Likewise, the user device 200 with at least two transceivers 210, 220 will enjoy the same benefits as the docking device 100 with two transceivers, such as a smaller or more well-defined communication zones, increased data rate and lower power consumption. A user device 200 with at least two transceivers 210, 220 may have the transceivers 210, 220 oriented such that their respective communication zone 211, 221 at least partially overlap in an overlapping communication zone 231.

Figure 3:
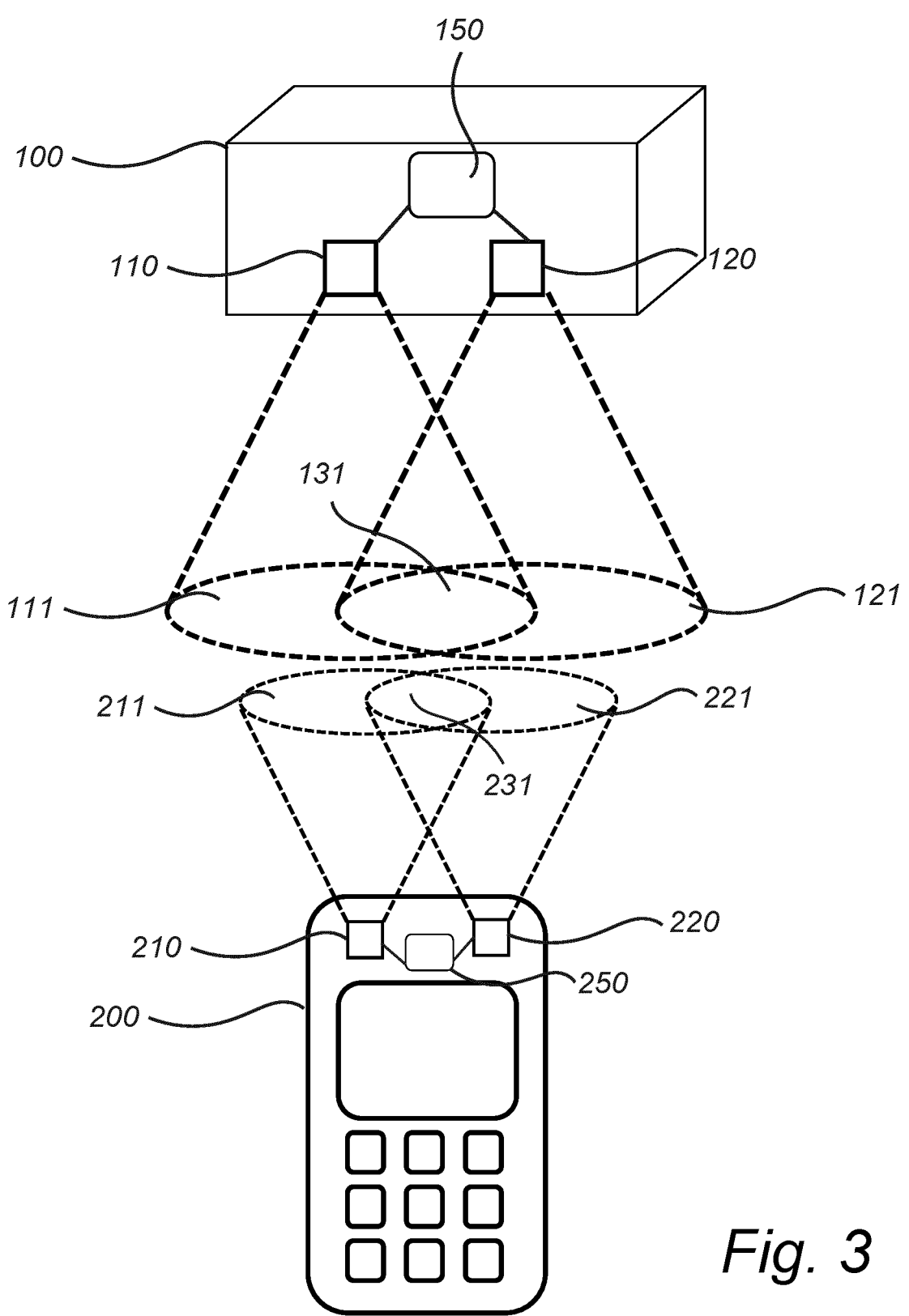
FIG. 3 is an illustration of a system for transferring data between a docking station and a user device via LiFi according to an aspect of the present invention, the user device comprising at least two LiFi transceivers.

FIG. 3 illustrates a system for transferring data between a docking station 100 and a user device 200, wherein the docking station 100 and the user device 200 each comprises two LiFi transceivers 110, 120, 210, 220, a first LiFi transceiver and a second LiFi transceiver.

The user device 200 comprises a data transfer control unit 250. In accordance with embodiments of the invention the data transfer control unit 250 acquires a communication channel transfer property for each of the at least four communication channels. The at least four communication channels forming two pairs, a first pair with the first and fourth communication channels and a second pair with the second and third communication channels. It is understood that for the first and second pair of communication channels respectively, the LiFi transceivers 110, 120, 210, 220 are each associated with only one communication channel. Based on the communication channel transfer property of the four communication channels, the data transfer control unit 250 selects one pair, and transmits data over the selected pair of communication channels. Thus, a higher data throughput is achieved. Selecting one pair of communication channels for data transfer may comprise generating a total communication channel pair capacity for each of the communication channel pairs. In one example the communication channel transfer property is a communication channel SNR. From the acquired SNR of the first and fourth communication channels of the first pair a channel capacity is extracted or approximated for each channel, the sum of the channel capacity for the first and fourth communication channel will be the total communication channel pair capacity for the first pair of communication channels. Similarly, the total communication channel pair capacity of the second pair of communication channels is the sum the channel capacity of the second and third communication channel. Selecting a pair of communication channels may comprise computing, by the data transfer control unit 250, the total communication channel pair capacity for each pair and selecting the pair of communication channels associated with the highest total capacity.

Additionally, the data transfer control unit 250 of the user device 200 may acquire a data rate dedicated SNR. The data transfer control unit 250 determines that at least the first communication channel out of the four communication channels has an SNR which exceeds or is equal to the data rate dedicated SNR. In response to such a determination, the data transfer control unit 250 selects the first communication channel and transfers data over the first communication channel. The data transfer control unit 250 may further disable the second LiFi transceiver 220 of the user device 200, as this transceiver 220 is not used by the user device 200 when transferring data to/from the docking station 100 via the first communication channel. Which conserves power. Accordingly, the data transfer control unit 250 of the user device may be adapted to change the user device 200 from a multi-channel communication state to a single channel communication state.

The data transfer control unit 250 may acquire an minimum link SNR for the purpose of determining if the user device 200 is in a communication position/orientation. The data transfer control unit 250 determines whether at least one of the communication channels has an SNR below that of the minimum link SNR. In response to a communication channel having an SNR below that of the minimum link SNR, the data transfer control unit 250 disables the first and second LiFi transceivers 210, 220 of the user device 200. Thus, communication between the user device 200 and the docking station 100 is disabled if the user device 200 is not a communication position/orientation. Alternatively, the data transfer control unit 250 disables the first and second LiFi transceiver 210, 220 of the user device 200 only if the SNR of all communication channels is below the minimum link SNR.

The above applies mutatis mutandis from a docking station perspective, i.e. for systems wherein the docking station comprises a data transfer control unit 150 for controlling the data transfer and the LiFi transceivers 110, 120. While the user device 200 comprises two transceivers 210, 220.

Figure 4:
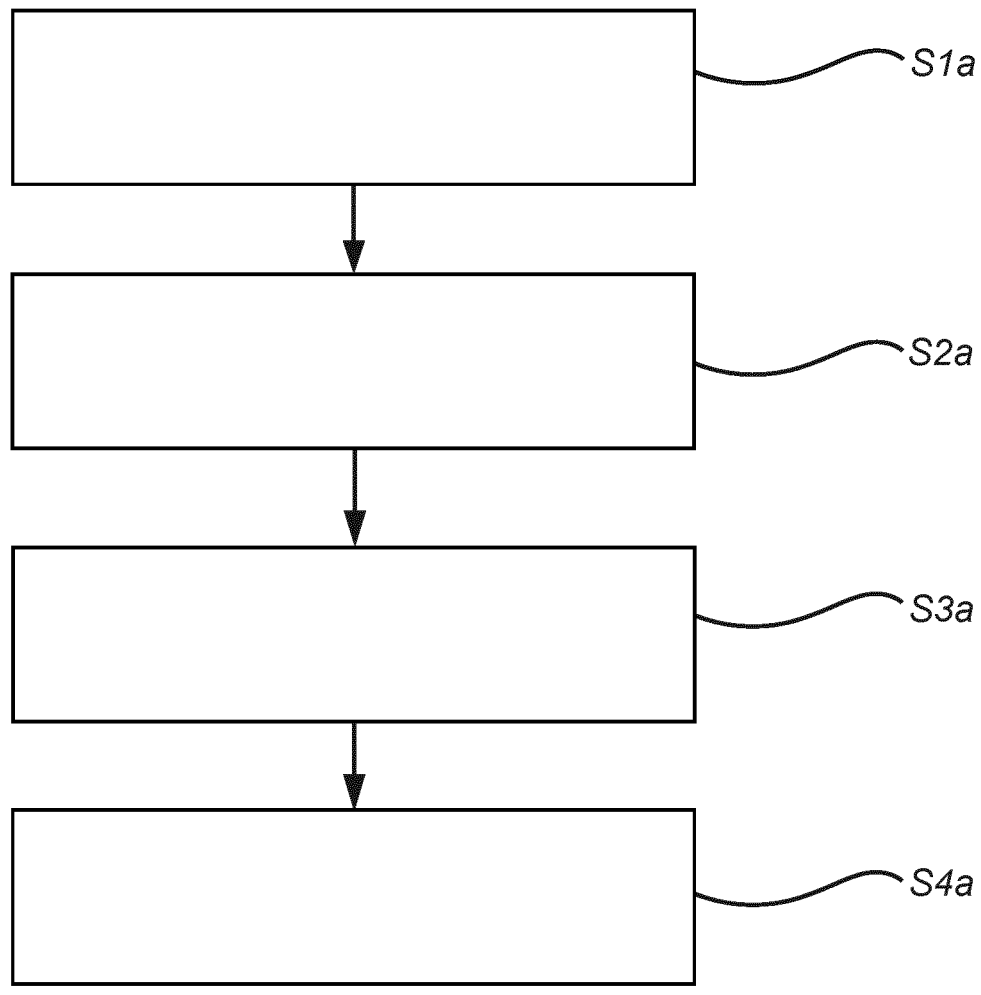
FIG. 4 is a flow chart of a method according to embodiments of the present invention.

The flow chart in FIG. 4 describes a method according to an aspect of the present invention in steps S1*a* (acquiring transfer property), S2*a* (selecting channel) and S3*a* (transmitting data), with optional step S4*a* (disabling one LiFi transceiver) describing some embodiments of the invention. The method facilitates transfer of data over LiFi between two entities, a first control entity with at least two LiFi transceivers, and a second entity with at least one LiFi transceiver (e.g. the systems depicted in FIG. 1 and FIG. 2). At Sla a first and second communication channel transfer property is acquired. With the acquired transfer property of each communication channel the method goes to S2*a* and selects one out of the two communication channels, e.g. the communication channel with the highest SNR is selected. At S3*a* the method comprises transferring data over the selected communication channel. Further, the method may involve optional step S4*a* which comprises disabling a LiFi transceiver not forming a part of the selected communication channel.

Figure 5:
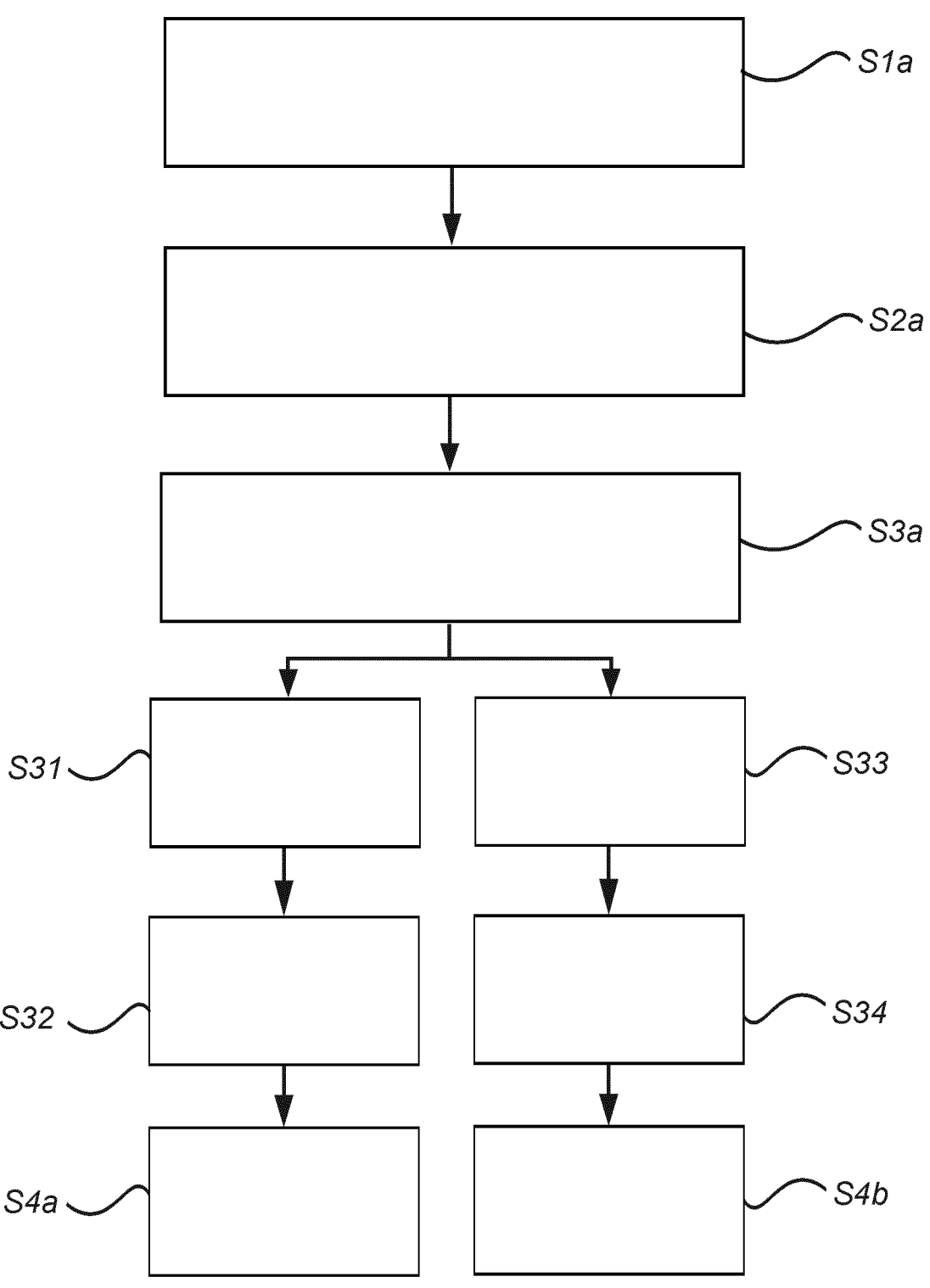
FIG. 5 is a flow chart of a method according to embodiments of the present invention wherein one of the docking station and the user device comprises two LiFi transceivers, the other one comprising at least one LiFi transceiver.

With further reference to FIG. 5 there is illustrated a flow chart of a method according to some embodiments of the present invention. Following the steps S1*a*, S2*a* and S3*a* there is illustrated the optional steps S31 (acquiring data rate dedicated SNR), S32 (determining that the first communication channel exceeds the data rate dedicated SNR) and S4*a* for disabling a LiFi transceiver in response to an acquired data rate dedicated SNR. The optional steps S33 (acquiring minimum link SNR), S34 (determining that at least one communication channel has insufficient SNR), S4*b* (disabling two LiFi transceivers) relate to disabling two LiFi transceivers in response to at least one channel having insufficient SNR in comparison to the acquired minimum link SNR.

At S3*a*, first entity acquires a data rate dedicated SNR. The method moves to step S32 and determines, e.g. by comparing, that the SNR of the first communication channel exceeds the data rate dedicated SNR. At S4*a* the second LiFi transceiver is disabled, leaving the first communication channel active for transferring data.

Additionally or alternatively, the method may go to S33, and acquire an minimum link SNR. After S33 the method goes to S34 and determines, e.g. by comparison, that at least one or both of the communication channels have an insufficient SNR, being below that of the minimum link SNR. In response to determining that the SNR of at least one of the communication channels is insufficient the method goes to S4*b*, and disables both LiFi transceivers as it is determined that the entities are not properly oriented for communication.

Moreover, the steps S31 and S33 involving acquiring a data rate dedicated SNR or minimum link SNR may occur at any time before step S32 and S34, e.g. in connection to acquiring the communication channel transfer property in step S2*a*. It is understood that the steps involved in the two branches in FIG. 5, for disabling one or two LiFi transceivers, may occur simultaneously or in parallel.

Figure 6:
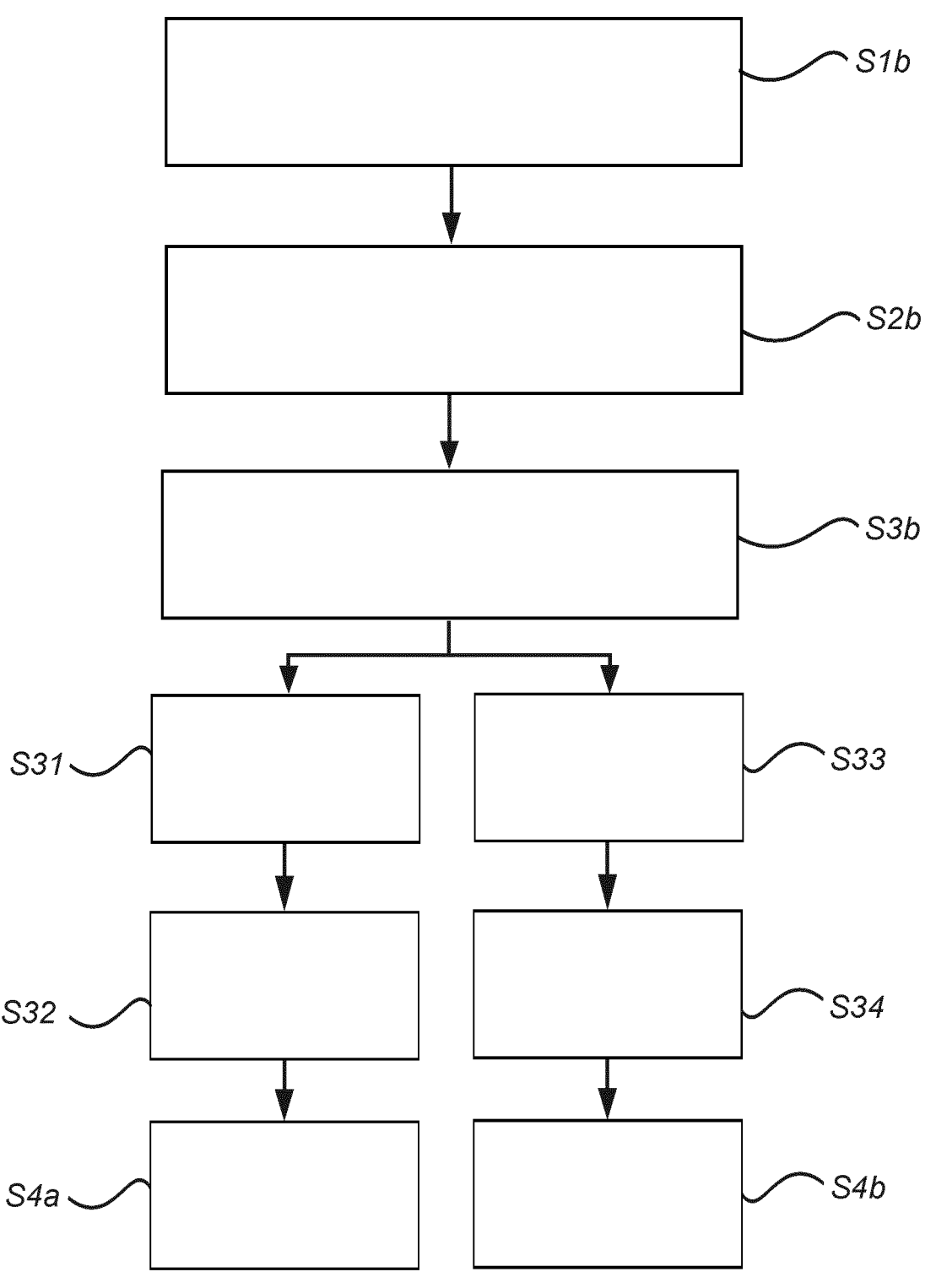
FIG. 6 is a flow chart of a method according to embodiments of the present invention, wherein both the docking station and the user device comprises at least two LiFi transceivers.

With reference to FIG. 6 there is described a method according to embodiments of the present invention for transferring data over LiFi between two entities, each entity comprising at least two LiFi transceivers (such as e.g. between the docking station and the user device from FIG. 3). From the perspective of a control entity at S1*b* a first, second, third and fourth communication channel transfer property is acquired. From the at least four communication channels at least two pairs of communication channels are defined as mentioned in the above. With the acquired transfer property of each communication channel the method goes to S2*b* (selecting communication channel pair) and selects one out of the two pairs of communication channels, e.g. the communication channel pair with the highest total communication channel pair capacity. At S3*b* (transmit data over selected pair of communication channels) the method comprises transferring data over the selected pair of communication channels. The method may further comprise the step of acquiring a data rate dedicated SNR S31 being indicative of a required/requested data throughput between the two entities. After acquiring a data rate dedicated SNR the method may go S32 and determine that the first communication channel SNR exceeds the data rate dedicated SNR and, in response to such a determination, the method goes to S4*a* and disables the second LiFi transceiver of the control entity. After disabling the second LiFi transceiver of the control entity the communication mode between the two entities may switch from a two-channel communication mode to a single-channel communication mode which is beneficial at least in in terms of power consumption.

Alternatively or additionally, the method may at S33 acquire an minimum link SNR. After S33 the method determines at S34 that at least one, at least two, at least three, or all four of the communication channels are associated with an SNR below that of the minimum link SNR. After determining that e.g. at least one of the communication channels has an SNR below that of the minimum link SNR the method goes to S4*b* comprising disabling the two LiFi transceivers of the entity. Alternatively, the method goes to S4*b* and disables the two LiFi transceivers only in response to all four communication channels being below the minimum link SNR.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A method for transferring data between a docking station and a user device via LiFi,
    wherein said docking station comprises at least two LiFi transceivers, and wherein the user device comprises at least one LiFi transceiver, said method comprising:
    acquiring a first communication channel transfer property, said first communication channel being between a first LiFi transceiver of said docking station and a first LiFi transceiver of said user device, acquiring a second communication channel transfer property, said second communication channel being between a second LiFi transceiver of said docking station and said first LiFi transceiver of said user device, selecting one communication channel out of said first and second communication channels based on a comparison between the acquired transfer properties for the first communication channel and the second communication channel, and transmitting data over said selected communication channel;

wherein a channel transfer property is a channel performance indicator related to at least one of a SNR of the channel, the channel capacity, a maximum data rate, and a power consumption per megabyte of transferred data, and disabling at least one of said first and second LiFi transceivers of said docking station not forming part of said selected communication channel.

2. The method according to claim 1, wherein said user device comprises at least two LiFi transceivers, said method further comprises:

acquiring a third communication channel transfer property, said third communication channel being between a first LiFi transceiver of said docking station and a second LiFi transceiver of said user device, acquiring a fourth communication channel transfer property, said fourth communication channel being between a second LiFi transceiver of said docking station and said second LiFi transceiver of said user device, wherein said first and fourth communication channels form a first pair of communication channels and said second and third communication channels form a second pair of communication channels, selecting one of said first and second pair of communication channels based on the acquired transfer property for each channel, and transmitting data over said selected pair of communication channels.

3. The method according to claim 1, further comprising:
acquiring a minimum link SNR,
determining that the SNR of at least one of said first and second communication channels is below said minimum link SNR, and
in response to such a determination, disabling the first and second communication channels.

4. The method according to claim 3, further comprising:
acquiring by the docking station a minimum link SNR,
determining by the docking station that the SNR of at least one of said first, second, third and fourth communication channels is below said minimum link SNR, and
disabling said first and second LiFi transceiver of said docking station.

5. The method according to claim 1 further comprising:
acquiring a data rate dedicated SNR,
determining that the SNR of at least said first communication channel exceed said data rate dedicated SNR, and
selecting said first communication channel.

6. The method according to claim 5, further comprising:
disabling the second LiFi transceiver of said docking station or the second transceiver of the user device.

7. The method according to claim 1, wherein acquiring a communication channel transfer property comprises acquiring a downlink communication channel transfer property and/or acquiring an uplink communication channel transfer property.

8. The method according to claim 1, further comprising:
transmitting, by one of said docking station and said user device, data indicating that a communication channel is selected, and
receiving, by the other one of said docking station and said user device, said data indicating that a communication channel is selected.

9. A non-transitory computer readable medium comprising instructions, the instructions when executed by a computer device, cause the computer device to perform the method of claim 1.

10. A method for transferring data between a docking station and a user device via LiFi,
wherein said docking station comprises at least one LiFi transceiver, and wherein said user device comprises at least two LiFi transceivers, said method comprising:
acquiring a first communication channel transfer property, said first communication channel being between a first LiFi transceiver of said user device and a first LiFi transceiver of said docking station,
acquiring a second communication channel transfer property, said second communication channel being between a second LiFi transceiver of said user device and said first LiFi transceiver of said docking station,
selecting one communication channel out of said first and second communication channels based on a comparison between the acquired transfer properties for the first communication channel and the second communication channel, and
transmitting data over said selected communication channel;
wherein a channel transfer property is a channel performance indicator related to at least one of a SNR of the channel, the channel capacity, a maximum data rate, and a power consumption per megabyte of transferred data.

11. The method according to claim 10, further comprising:
disabling at least one of said first and second LiFi transceivers of said user device not forming part of said selected communication channel.

12. A non-transitory computer readable medium comprising instructions, the instructions when executed by a computer device, cause the computer device to perform the method of claim 10.

13. A system for transferring data, said system comprising:
a docking station, wherein said docking station comprises at least two LiFi transceivers and a data transfer control unit, a user device, wherein said user device comprises at least one LiFi transceiver, and
wherein said data transfer control unit is adapted to acquire a first communication channel transfer property, said first communication channel being between a first LiFi transceiver of said docking station and a first LiFi transceiver of said user device, acquire a second communication channel transfer property, said second communication channel being between a second LiFi transceiver of said docking station and said first LiFi transceiver of said user device, and
wherein said data transfer control unit is further adapted to select at least one communication channel out of said first and second communication channels based on a comparison between the acquired channel properties for the first communication channel and the second communication channel and control at least one of said LiFi transceivers of said docking station for transmission of data over said selected communication channel;

wherein a channel transfer property is a channel performance indicator related to at least one of a SNR of the channel, the channel capacity, a maximum data rate, and a power consumption per megabyte of transferred data, and wherein at least one of said first and second LiFi transceivers of said docking station not forming part of said selected communication channel is disabled.

14. A system for transferring data, said system comprising:

a docking station, wherein said docking station comprises at least one LiFi transceiver, a user device, wherein said user device comprises at least two LiFi transceivers and a data transfer control unit, wherein said data transfer control unit is adapted to acquire a first communication channel transfer property, said first communication channel being between a first LiFi transceiver of said user device and a first LiFi transceiver of said docking station, acquire a second communication channel transfer property, said second communication channel being between a second LiFi transceiver of said user device and said first LiFi transceiver of said docking station, and wherein said data transfer control unit is further adapted to select at least one communication channel out of said first and second communication channels based on a comparison between the acquired channel properties for the first communication channel and the second communication channel and control said at least one of said LiFi transceivers of said user device for transmission of data over said selected communication channel;

wherein a channel transfer property is a channel performance indicator related to at least one of a SNR of the channel, the channel capacity, a maximum data rate, and a power consumption per megabyte of transferred data.

* * * * *